United States Patent [19]

Kronenberger et al.

[11] Patent Number: 5,028,150
[45] Date of Patent: Jul. 2, 1991

[54] ANTI-FRICTION BEARING FOR HEAT RESISTANCE

[75] Inventors: Alban Kronenberger, Schweinfurt; Oswald Bayer, Aidhausen, both of Fed. Rep. of Germany

[73] Assignee: FAG Kugelfischer Georg Schäfer (KGaA), Fed. Rep. of Germany

[21] Appl. No.: 379,419

[22] Filed: Jul. 23, 1989

[30] Foreign Application Priority Data

Jul. 26, 1988 [DE] Fed. Rep. of Germany ....... 3825326

[51] Int. Cl.$^5$ .................. F16C 19/50; F16C 33/62
[52] U.S. Cl. .................................. 384/476; 384/492; 384/506; 384/905
[58] Field of Search ............... 384/476, 492, 493, 499, 384/504, 505, 506, 905

[56] References Cited

U.S. PATENT DOCUMENTS

| 4,226,485 | 10/1980 | Pruvot | 384/905 X |
| 4,573,809 | 3/1986 | Jacob | 384/905 X |
| 4,728,838 | 3/1988 | Mandel et al. | 384/476 X |

FOREIGN PATENT DOCUMENTS

| 0087834 | 8/1983 | European Pat. Off. | |
| 3617402A1 | 12/1986 | Fed. Rep. of Germany | |
| 861779 | 9/1981 | U.S.S.R. | 384/506 |
| 2025153 | 1/1980 | United Kingdom | 384/905 |

*Primary Examiner*—Thomas R. Hannon
*Attorney, Agent, or Firm*—Ostrolenk, Faber, Gerb & Soffen

[57] ABSTRACT

An anti-friction bearing unit, particularly for use in an exhaust gas turbo charger. The unit includes two anti-friction bearings axially spaced apart from each other on a shaft. High temperature occurs on one end of the shaft. A precise mounting is provided which is not sensitive to high temperatures on at least the axial side exposed to high temperature. The bearing outer ring, which is the ring not subject to high temperatures, consists of one piece. The bearing inner ring is widened and divided into two sections at its axial middle. The axial portion of the divided inner ring which is exposed to high temperature consists of material of high heat resistance. The high heat resistance material is, for example, 80 MoCrV 42 16 (M 50) or X 102 CRMo 17 (AISI 440 C). An additional intermediate ring around the shaft at the high temperature and helps reduce heat transmission.

10 Claims, 2 Drawing Sheets

ANTI-FRICTION BEARING FOR HEAT RESISTANCE

BACKGROUND OF THE INVENTION

The present invention relates to an antifriction bearing which resists heat, particularly heat applied at an axial end of the bearing. The bearing has particular application for exhaust gas turbochargers.

Exhaust gas turbochargers operate at a high speed rotation. In addition, they develop high temperatures. In particular, high temperature is applied at one axial end of the bearing. This combination of operating conditions makes extreme demands on the precision and heat resistance of the mounting of the bearing.

Plain bearings were used in order to support the shafts of the turbocharger. A change has recently been attempted to use anti-friction bearings. See European Unexamined Application 87 834 and German Unexamined Application OS 36 17 402. In such bearing units, standard anti-friction bearings are arranged on a shaft axially spaced from each other. The bearings are axially pre-tensioned by springs to obtain the desired precision and are cooled by various expensive cooling means. These create complicated mountings and their operating action is not predictably optimal.

An anti-friction bearing unit in which the invention is used comprises two anti-friction bearings which are axially spaced apart from each other along a shaft. Particularly in a turbo charger, the two bearings are arranged so that high temperature occurs on one axial side of the shaft covering one of the two bearing rows.

SUMMARY OF THE INVENTION

It is therefore the object of the present invention to improve the anti-friction bearing unit for precise mounting of the bearings without damage occurring to one of the bearings due to high temperatures being applied to the one bearing and particularly to the one inner ring of the one bearing, and more particularly to one axial side of the shaft on which the one bearing is placed.

Another object is to provide such bearings for exhaust gas turbochargers.

These objects are achieved by utilizing two spaced apart bearings on an operating shaft. The high temperature is applied toward one axial end of the shaft. There is a single piece outer ring for the two bearings of the anti-friction bearing unit. The inner ring is widened and is comprised of two separate, axially neighboring ring parts. That inner ring part which is adjacent to the high temperature is formed of a material of high heat resistance. Examples of such materials of high heat resistance are 80 MoCrV 42 16 (M 50) and X 102 CRMo 17 (AISI 440 C). The bore of the inner ring part which is comprised of heat resistant material has at least one section whose diameter corresponds to that of the shaft provide a proper fit. The neighboring second section of the inner ring part, closest to the heat, and preferably radially inside the bearing rollers, has an axially extending, narrow radial slot defined between the inner ring part second section and the shaft to reduce the path of heat conduction into the inner ring from the shaft.

An additional intermediate ring may also be provided on the end of the inner ring section of heat resistant material. The additional ring may also be of a material of increased resistance to heat transmission to permit the bearing to operate without being distorted or having its operation interfered with by the heat of its environment.

The foregoing and other objects and features of the invention are disclosed in the following description and accompanying drawings.

DESCRIPTION OF THE PREFERRED EMBODIMENTS

Figure 1:
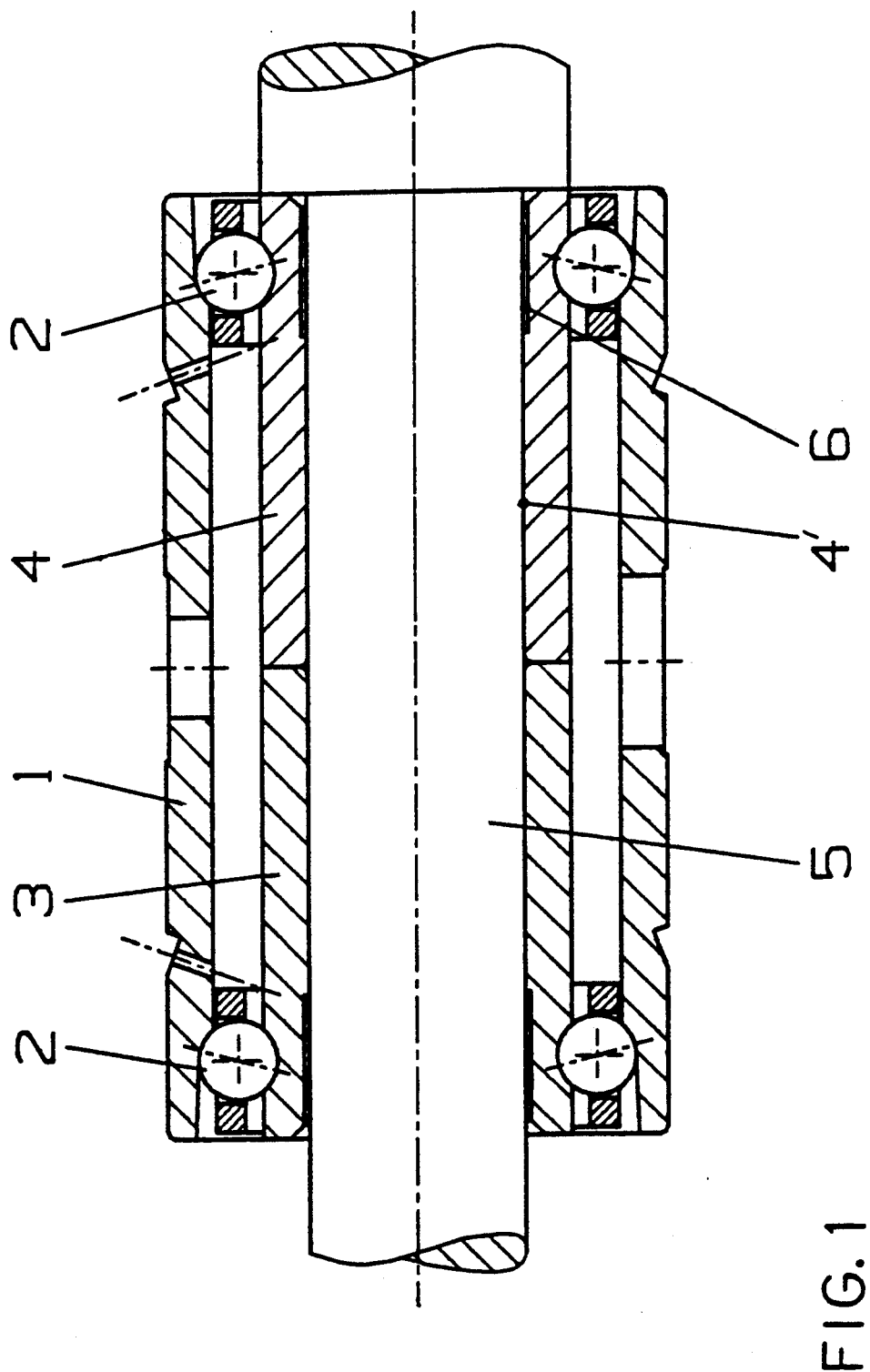
FIG. 1 is a cross-sectional view taken through the mounting of an exhaust gas turbocharger in accordance with the present invention.

Referring to FIG. 1, the double row angular ball bearing has a single piece outer ring 1 and has two rows 2 of bearing rolling elements, here bearing balls, arranged at a substantial axial distance apart. The axially widened inner ring is divided at its axial middle and is comprised of two inner ring parts 3 and 4 which are both seated on a shaft 5. The inner ring part 4 is of a material which is greatly resistant to heat, of the type pointed out above, and is arranged on the axial side of the bearing where the high temperatures occur in an exhaust gas turbo charger. Because the inner ring part 4 is of high heat resistance, it reduces the danger of a failure of the bearing. Due to the division of the ring parts, it is possible to make the other inner ring part 3 of relatively inexpensive, normal bearing steel.

Heat transfer is further reduced by providing a slot 6 between the inner ring part 4 and the shaft 5 in the region of the ball row 2. The ball row is radially outward of that slot. In order to obtain a good seat of the inner ring part on the shaft 5, inner ring part 4 has in the region 4' adjacent the slot 6 a bore diameter corresponding to the exterior diameter of shaft 5. In addition, the slot 6 has the advantage that the influence of a fit overlap between the shaft and the inner ring is reduced to the vertex radial play of the bearing.

Figure 2:
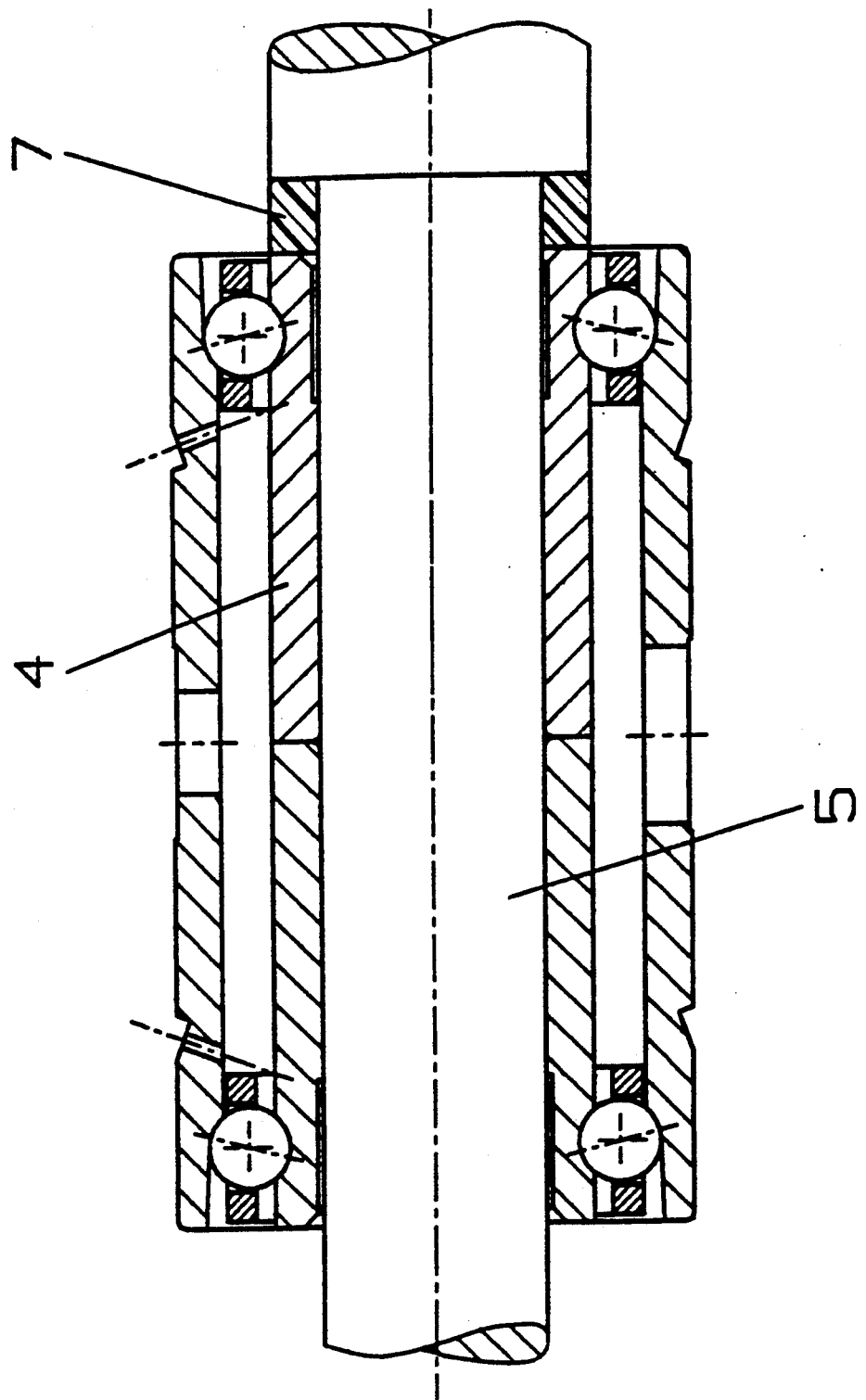
FIG. 2 is the same type of view of a modified form of the structure of FIG. 1.

Referring to FIG. 2, the arrangement of an intermediate ring 7 of increased heat transmission resistance on the end of the inner ring 4 at the shaft 5, also increases the resistance of the bearing to distortion by heat by reducing further the temperature stress on the anti-friction bearing.

In the foregoing, the present invention has been described in connection with preferred embodiments thereof. Since many variations and modifications of the present invention will now be obvious to those skilled in the art, it is preferred that the scope of this invention be determined, not by the specific disclosures herein contained, but by the appended claims.

What is claimed is:

1. An anti-friction bearing means for use in a heated environment comprising:
   a shaft;
   first and second anti-friction bearings axially spaced apart from each other along the shaft;
   the shaft being arranged so that high temperatures occur toward one axial end of the shaft; the anti-friction bearings having an outer ring, of a single piece extending around the first and second bearings;
   the bearing means having an inner ring comprised of first and second axially neighboring sections, the first inner ring section being toward the high temperature end of the shaft and the first inner ring section being comprised of material of high heat resistance than the second section of the inner ring.

2. The anti-friction bearing means of claim 1, wherein the section of higher heat resistant material includes an axial region whose inner diameter corresponds to the outer diameter of the shaft and also includes an axial slot between the inner ring section and the shaft at the end of the shaft that is heated.

3. The anti-friction bearing means of claim 2, wherein the first bearing is located at the first section of the inner ring, and the second bearing is located at the second section of the inner ring.

4. The anti-friction bearing means of claim 3, wherein the first bearing is around the first section of the inner ring axially at the slot.

5. The anti-friction bearing means of claim 2 which is to be used for a gas turbo charger and the shaft being part of the turbo charger.

6. The anti-friction bearing means of claim 1 further comprising an intermediate ring at the axial side of the inner ring at the end of the shaft that is heated, the intermediate ring being in heat conductive contact with the inner ring to increase the resistance to heat transmission.

7. The anti-friction bearing means of claim 1 in which the heat resistant material is 80 MoCrV 42 16 (M 50).

8. The anti-friction bearing means of claim 1 in which the heat resistant material is X 102 CRMo 17 (AISI 440 C).

9. The anti-friction bearing means of claim 1, wherein the inner ring sections are separate sections.

10. The anti-friction bearing means of claim 1, wherein the first bearing is located at the first section of the inner ring, and the second bearing is located at the second section of the inner ring.

* * * * *